United States Patent [19]

Tarleton

[11] Patent Number: 4,544,850

[45] Date of Patent: Oct. 1, 1985

[54] RACE CONDITION MEDIATOR CIRCUIT

[75] Inventor: George K. Tarleton, Itasca, Ill.

[73] Assignee: GTE Automatic Electric Incorporated, Northlake, Ill.

[21] Appl. No.: 558,227

[22] Filed: Dec. 5, 1983

[51] Int. Cl.[4] ........................ H04L 7/04; H03K 19/08

[52] U.S. Cl. .................................... 307/269; 307/528; 307/272 A; 307/443; 307/590; 307/542; 307/480; 328/72; 328/63; 375/118; 370/85; 340/825.5

[58] Field of Search ................... 307/528, 269, 272 R, 307/272 A, 442, 480, 481, 443, 453, 590, 592, 593, 542; 328/72, 63, 164; 371/47, 61; 375/106, 118, 119; 365/233, 200; 364/900; 370/85; 340/825.5

[56] References Cited

U.S. PATENT DOCUMENTS 3,912,947 10/1975 Buchanan ........................... 307/269
4,380,736 4/1983 Pfaff ...................................... 328/73
4,394,763 7/1983 Nagano et al. ........................ 371/38
4,464,769 8/1984 Forsberg et al. .................. 375/110

*Primary Examiner*—Stanley D. Miller
*Assistant Examiner*—R. R. Roseen
*Attorney, Agent, or Firm*—Gregory G. Hendricks

[57] ABSTRACT

A circuit which eliminates race conditions caused by gate delay variation. In the absence of gate delay variations data is made available for a period of time which extends beyond commencement of processing of such data. This circuit prevents gate delay variations from causing processing to commence after the period of time during which data is available. Each of a pair of flip-flops initiates or terminates the data available time period. These flip-flops, an exclusive-or gate and related circuitry are arranged such that the period of time for data availability is not terminated until after processing of such data actually commences.

11 Claims, 2 Drawing Figures

FROM CPU
-DEN
I1a
I1
I3
+5V
PRE
J
Q
F1
CLK
K
CLR
G2
I4
-NEW DEN
DATA -IN
G3a
G3
ENB
FROM CPU
-RD
I2a
I2
G1
PRE
J
Q
F2
CLK
K
CLR
DATA-OUT
G3b
+5V
TO CPU
PRE
J
Q
F3
CLK
K
CLR
DATA-LATCHED
F3a
-PWR-CLR
PC1

RACE CONDITION MEDIATOR CIRCUIT

FIELD OF THE INVENTION

The present invention relates to circuitry which enables and processes data. More particularly, it relates to elimination of race conditions between such data enablement and data processing.

BACKGROUND OF THE INVENTION

Race conditions are typically eliminated through use of delay lines or specially selected gates. Another approach is to individually test the complete circuit over its full temperature range and to replace gates that cause failure. However, such methods are expensive and time consuming.

SUMMARY OF THE INVENTION

In accordance with the present invention, a race condition mediator circuit is provided for use in a processing system which includes a processing unit and a data unit. The processing unit is operative to provide a data request signal and a clock signal, and the data unit is operative to provide a data signal in response to the data request signal.

The race condition mediator circuit comprises timing means connected to the processing unit and operative in response to the data request signal to provide a data enable signal, a first gating means connected to the timing means and the data unit and operative in response to the data enable signal and the data signal to provide a gated data signal, and output storage means connected to the first gating means and the processing unit and operative in response to the clock signal and the gated data signal to provide a latched data signal. The timing means is further operative in response to an absence of the data request and clock signals to inhibit the data enable signal.

DESCRIPTION OF THE PREFERRED EMBODIMENT

Figure 1:
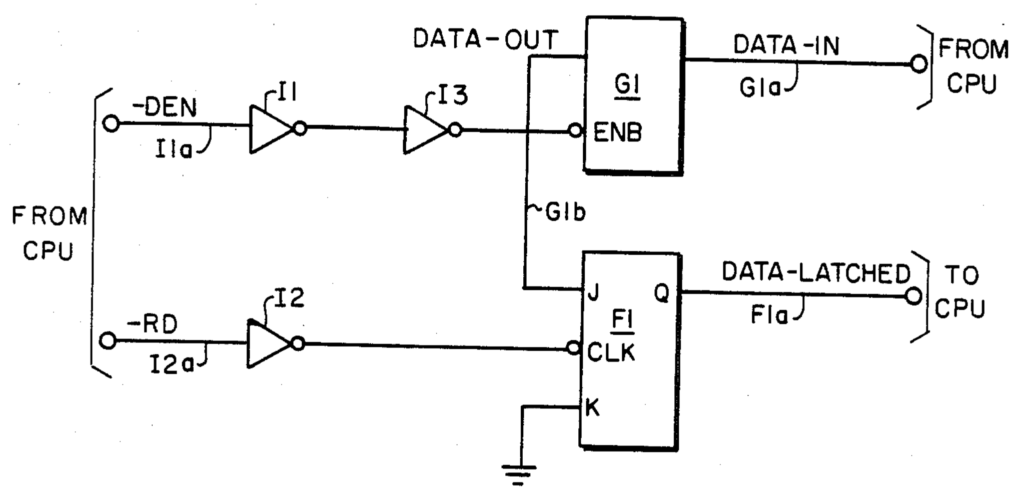
FIG. 1 is a logic diagram of the prior art.

Referring now to FIG. 1 of the accompanying drawing, the prior art circuit is shown connectable to a central processing unit (CPU). This circuit includes inverters I1 and I2 connectable to the CPU via data enable and read leads I1*a* and I2*a*, respectively. Inverter I1 is connected to the enable (ENB) input of tri-state gate G1 via inverter I3 and inverter I2 is connected to the clock input of flip-flop F1. Tri-state gate G1 is connectable to the memory via data-in lead G1*a* and it is connected to the J input of flip-flop F1 via data-out lead G1*b*. The K input of flip-flop F1 is connected to ground and the Q output of this flip-flop is connectable to the CPU via data-latched lead F1*a*.

This circuit is typically used for strobing data into a register for further processing such as error checking. To do this the CPU applies a logic level 0 $\overline{RD}$ (read) signal to lead I2*a*. This logic level 0 signal is inverted to a logic level 1 signal by inverter I2 and applied to the clock input of flip-flop F1. Since this flip-flop is a negative triggered flip-flop the logic level 1 signal appearing at the clock input has no effect.

The CPU then applies a logic level 0 $\overline{DEN}$ (data enable) signal to lead I1*a*. This logic level 0 signal is inverted to a logic level 1 by inverter I1 and then a logic level 0 by inverter I3. This logic level 0 signal is then applied to the enable (ENB) input of tri-state gate G1. This gate then gates data appearing on data-in lead G1*a* to data-out lead G1*b*. Consequently, this gated data appears at the J input of flip-flop F1.

The CPU then removes both the logic level 0 $\overline{RD}$ and $\overline{DEN}$ signals and applies logic level 1 signals to leads I1*a* and I2*a*. The logic level 1 signal appearing on lead I1*a* is inverted to a logic level 0 signal by inverter I1 and then to a logic level 1 signal by inverter I3. This logic level 1 signal then appears at the enable (ENB) input of tri-state gate G1 and causes it to turn off, thereby removing data from the J input of flip-flop F1.

The logic level 1 $\overline{RD}$ signal appearing on lead I2*a* is inverted a logic level 0 signal by inverter I2. This logic level 0 signal clocks flip-flop F1 and causes the data appearing at its J input to be stored in flip-flop F1 and therefore held at the Q output of this flip-flop. This data is then available to the CPU via data-latched lead F1*a*.

If inverters I1–I3 all have the same gate delays, simultaneous removal of the data enable and read signals (i.e., application of logic level 1 signals to leads I1*a* and I2*a*)does not result in any race conditions since flip-flop F1 is clocked before tri-state gate G2 is disabled. This absence of race conditions is ensured through provision of two gate delays between tri-state gate G1 and the CPU and only one gate delay between flip-flop F1 and the CPU. However, gate delays are not always of a constant value. Typically, gate delays vary from one nanosecond (ns) minimum to 15 ns maximum. Thus, whether or not true data is clocked into the register is dependent upon the gate delays of inverters I1–I3 and tri-state gate G1. If inverters I1 and I3 and tri-state gate G1 all have minimum propagation delays of 1 ns each and inverter I2 has a maximum propagation delay of 15 ns, then this circuit would fail because tri-state gate G1 would be turned off after a 3 ns delay which is 12 ns before flip-flop F1 would be clocked.

The present invention ensures that tri-state gate G1 is not turned off until flip-flop F1 is clocked even if, due to gate delays, the logic level 1 $\overline{DEN}$ signal propagates through the circuit before the logic level 1 $\overline{RD}$ signal.

Figure 2:
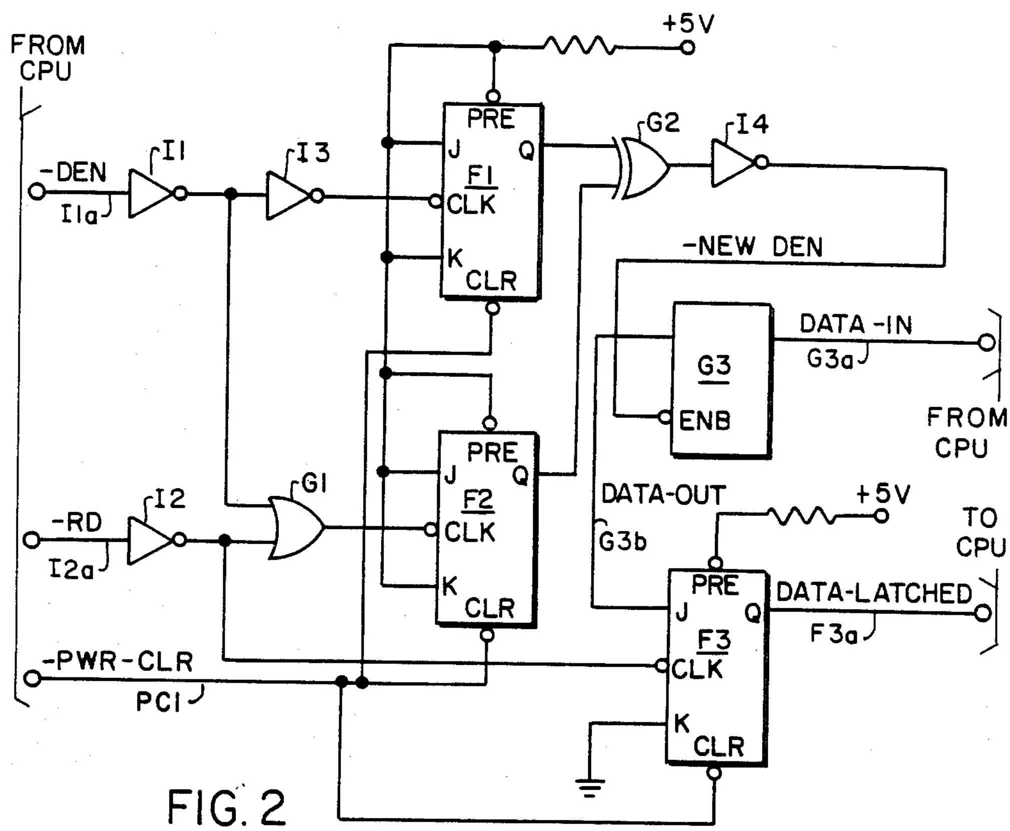
FIG. 2 is a logic diagram of the Race Condition Mediator Circuit of the present invention.

Referring now to FIG. 2 the race condition mediator circuit of the present invention is shown connectable to the CPU. This circuit includes inverters I1 and I2 connectable to the CPU via data enable lead I1*a* and read lead I2*a*, respectively. Inverter I1 is connected to the clock (CLK) input of flip-flop F1 via inverter I3. Inverters I1 and I2 are connected to OR gate G1 which is connected to the clock input of flip-flop F2.

The J, K and preset (PRE) inputs of these flip-flops are connected to a +5 volt source which causes a logic level 1 signal to be applied to these inputs. The Q outputs of these flip-flops are connected to exclusive-or gate G2 which is connected to the enable (ENB) input of tri-state gate G3 via inverter I4.

Tri-state gate G3 is connectable to the memory via data-in lead G3*a*. This gate is further connected to the J input of flip-flop F3 via data-out lead G3*b*. The clock (CLK) input of flip-flop F3 is connected to inverter I2 and the K input of this flip-flop is connected to ground. The Q output of flip-flop F3 is connectable to the CPU via data-latched lead F3*a*. The clear inputs of flip-flops F1–F3 are all connected to each other and they are further connnectable to the CPU via the power clear lead PC1.

When power is applied to the CPU and the race condition mediator circuit, a logic level 0 power clear (PWR-CLR) signal is applied to the clear (CLR) inputs of flip-flops F1–F3, thereby causing them to reset. The CPU then applies a logic level 0 data enable ($\overline{DEN}$) signal to lead I1*a*. This logic level 0 signal is inverted to a logic level 1 by inverter I1 and then to a logic level 0 by inverter I3.

This logic level 0 signal is then applied to the clock input of flip-flop F1. Since the J and K inputs of this flip-flop are connected to a +5 volt source, logic level 1 signals are present at its J and K inputs. Consequently, when the logic level 0 signal appears at the clock (CLK) input of this flip-flop, it toggles and provides a logic level 1 signal at its Q output. Since flip-flop F2 had been reset when power was applied to the circuit, a logic level 0 signal appears at its Q output. Consequently, flip-flop F1 provides a logic level 1 signal to exclusive-or gate G2 and flip-flop F2 applies a logic level 0 signal to this gate.

Exclusive-or gate G2 then provides a logic level 1 signal which is inverted to a logic level 0 new-data-enable (NEW-DEN) signal. This logic level 0 signal is then applied to the enable (ENB) input of tri-state gate G3, thereby causing that gate to transfer the data appearing on its data-in lead G3*a* to its data-out lead G3*b*. The data on lead G3*b* then appears at the J input of flip-flop F3. Thus, tri-state gate G3 responds to the logic level 0 $\overline{DEN}$ signal in the same manner as the prior art circuit and causes data to appear at the J input of flip-flop F3.

Subsequently, when the data is stable at the data-out lead, the CPU removes both the data enable and read signals by simultaneously applying logic level 1 signals to leads I1*a* and I2*a*.

With the prior art arrangement if the gate delays of inverters I1 and I3 and tri-state gate G3 were short, and the gate delay of inverter I2 was long, then tri-state gate G3 would remove data from the J input of flip-flop F3 before that flip-flop was clocked. This would result in erroneous data being stored in flip-flop F3. However, with the arrangement of the present invention, gate delays are irrelevant since tri-state gate G3 is not turned off until the data appearing at the J input of flip-flop F3 is strobed into that flip-flop.

Under this arrangemennt the CPU again simultaneously removes the data enable and read signals (as in the prior art) by applying logic level 1 signals to leads I1*a* and I2*a*. The logic level 1 signal appearing on lead I1*a* is inverted to logic level 0 signal by inverter I1 and then to a logic level 1 signal by inverter I3. The resultant logic level 1 signal appearing at the clock input of flip-flop F1 has no effect. Thus, removal of the data enable signal does not immediately cause tri-state gate G3 to turn off.

The logic level 0 signal from inverter I1 is also applied to the first input of OR gate G1. The logic level 1 signal appearing on lead I2*a* is inverted to logic level 0 signal and this logic level 0 signal is applied to the second input of gate G1 and also to the clock input of flip-flop F3. Thus, the data appearing at the J input of flip-flop F3 is clocked into that flip-flop before tri-state gate G3 is turned off.

The two logic level 0 signals appearing at the inputs of OR gate G1 then cause this gate to apply a logic level 0 signal to the clock input of flip-flop F2. This logic level 0 signal causes flip-flop F2 to toggle and thereby provide a logic level 1 signal at its Q output. Therefore, logic level 1 signals appear both inputs of exclusive-or gate G2 and this gate then provides a logic level 0 signal at its output. This logic level 0 signal is inverted to logic level 1 signal by inverter I4. This logic level 1 signal then appears at the enable (ENB) input of tri-state gate G3 and causes it to be turned off. Thus, tri-state gate G3 is not turned off until after the data appearing on data-out lead G3*b* has been clocked into flip-flop F3.

With this arrangement OR gate G1 logically "ORs" the inverted $\overline{DEN}$ and $\overline{RD}$ signals together and withholds the clock signal from flip-flop F2 until the trailing edge of the latter of the $\overline{DEN}$ and $\overline{RD}$ signals has passed. This prevents tri-state gate G3 from turning off until the latter of these two signals has passed. This arrangement ensures that valid data is strobed into flip-flop F3 by the logic level 1 RD signal, regardless of whether the circuitry in the path of tri-state gate G3 or flip-flop F3 is faster. After the data is strobed into flip-flop F3, the NEW-DEN signal is removed from tri-state gate G3 and that gate is turned off.

Exclusive-or gate G2 eliminates the need for resetting flip-flops F1 and F2 after every read cycle. Flip-flop F1 toggles on every leading edge of the $\overline{DEN}$ signal and flip-flop F2 toggles on every trailing edge of the $\overline{DEN}$ and $\overline{RD}$ signals. Exclusive-or gate G2 provides a logic level 0 signal whenever both of its inputs are at a logic level 0 or a logic level 1. It provide a logic level 1 signal only when its inputs are unequal. Therefore, there is no need to to reset flip-flops F1 and F2 after every read cycle because the NEW-DEN signal will be generated only when flip-flop F1 toggles and it will be removed when flip-flop F2 toggles, regardless of the logic level that these flip-flops are being switched to.

Thus the race condition mediator circuit of the present invention provides a novel arrangement for eliminating race conditions caused by unequal gate delays in data enable and data strobe paths.

It will be obvious to those skilled in the art that numerous modifications of the present invention can be made without departing from the spirit of the invention which shall be limited only by the scope of the claims appended hereto.

What is claimed is:

1. A race condition mediator circuit for use in a processing system which includes a processing unit and a data unit, said processing unit being operative to provide a data request signal and a clock signal, and said data unit being operative to provide a data signal in response to said data request signal, said race condition mediator circuit comprising:

timing means connected to said processing unit and operative in response to said data request signal to provide a data enable signal;

first gating means connected between said timing means and said data unit and operative in response to said data enable signal and said data signal to provide a gated data signal; and output storage means connected to said first gating means and said processing unit and operative in response to said clock signal and said gated data signal to provide a latched data signal;

said timing means being further operative in response to an absence of said data request and clock signals to inhibit said data enable signal.

2. A race condition mediator circuit as claimed in claim 1, wherein said first gating means comprises a tri-state gate having a data input connected to said data unit, a control input connected to said timing means and a data output connected to said output storage means.

3. A race condition mediator circuit as claimed in claim 1, wherein said output storage means comprises a J-K flip-flop having a data input connected to said first gating means and a clock input connected to said processing unit.

4. A race condition mediator circuit as claimed in claim 1, wherein said timing means comprises:

a first timing circuit connected to said processing unit and operative in response to said data request signal to provide a first timing signal;

second gating means connected to said processing unit and operative in response to an absence of said data request and clock signals to provide a gated clock signal;

a second timing circuit connected to said second gating means and operative in response to said gated clock signal to provide a second timing signal; and third gating means connected to said first and second timing circuits and operative in response to said first timing signal and an absence of said second timing or to said second timing signal and an absence of said first timing signal to provide said data enable signal, and further operative in response to said first and second timing signals or an absence of said first and second timing signals to inhibit said data enable signal.

5. A race condition mediator circuit as claimed in claim 4, wherein said second gating means comprises an OR gate.

6. A race condition mediator circuit as claimed in claim 4, wherein said third gating means comprises an exclusive-or gate.

7. A race condition mediator circuit as claimed in claim 4, wherein said first timing circuit comprises a flip-flop.

8. A race condition mediator circuit as claimed in claim 4, wherein said second timing circuit comprises a flip-flop.

9. A race condition mediator circuit as claimed in claim 7, wherein a logic level one signal is further included, said flip-flop comprising a J-K flip-flop having J, K and clock innputs, said J and K inputs being connected to said logic level one signal and said clock input being connected to said processing unit.

10. A race condition mediator circuit as claimed in claim 8, wherein a logic level one signal is further included, said flip-flop comprising a J-K flip-flop having J, K and clock inputs, said J and K inputs being connected to said logic level one signal and said clock input being connected to said second gating means.

11. A race condition mediator circuit as claimed in claim 4, wherein first, second and third inverters are further included, said first timing circuit being connected to said processing unit by the series combination of said first and second inverters, and said second gating means being connected to said processing unit by said first and third inverters whereby said second gating means receives said data request signal via said first inverter and said clock signal via said third inverter.

* * * * *